United States Patent [19]
Kim

[11] Patent Number: 6,044,443
[45] Date of Patent: Mar. 28, 2000

[54] PORTABLE COMPUTER WITH MEMORY MANAGEMENT SYSTEM AND METHOD FOR PROLONGING THE LIFETIME OF INTERNAL BATTERY

[75] Inventor: Han-Sang Kim, Seoul, Rep. of Korea

[73] Assignee: Samsung Electronics Co., Ltd., Kyungki-do, Rep. of Korea

[21] Appl. No.: 08/941,537

[22] Filed: Sep. 30, 1997

[30] Foreign Application Priority Data

Sep. 30, 1996 [KR] Rep. of Korea ................. 96-43259

[51] Int. Cl.$^7$ ................................................. G06F 12/00
[52] U.S. Cl. ..................... 711/154; 365/218; 365/227; 365/228; 365/229; 711/100; 711/103
[58] Field of Search ................................. 711/154, 100, 711/103, 106, 166; 365/218, 226–229

[56] References Cited

U.S. PATENT DOCUMENTS

| | | | |
|---|---|---|---|
| 5,371,702 | 12/1994 | Nakai et al. | 365/185 |
| 5,375,222 | 12/1994 | Robinson et al. | 711/103 |
| 5,418,752 | 5/1995 | Harari et al. | 365/218 |
| 5,594,360 | 1/1997 | Wojciechowski | 324/771 |
| 5,724,289 | 3/1998 | Watanabe | 365/201 |
| 5,832,285 | 11/1998 | Shimada | 713/323 |
| 5,889,721 | 3/1999 | Gannage | 365/226 |
| 5,925,139 | 7/1999 | Yamada et al. | 714/14 |

*Primary Examiner*—John W. Cabeca
*Assistant Examiner*—Pierre-Michel Bataille
*Attorney, Agent, or Firm*—Sughrue, Mion, Zinn, Macpeak & Seas, PLLC

[57] ABSTRACT

A memory management method for use in a portable computer to prolong the lifetime of an internal battery in the portable computer. The portable computer includes a non-volatile memory storage device. When the portable terminal is operating from the internal battery or cell, a recording operation is performed in an unused memory region and an address value of data to be deleted is registered in a delete queue, rather than being deleted at that time. Later, when the portable terminal is connected to an external power source, data to be deleted is deleted all at the same time, thereby reducing power consumption of the battery or cell in the portable computer. This method utilizes less capacity of the cell and prolongs operation time of the internal battery cell. Data can be recovered when a user desires recovery of the data unless the data corresponding to the address values recorded in the delete queue has already been deleted.

20 Claims, 4 Drawing Sheets

PORTABLE COMPUTER WITH MEMORY MANAGEMENT SYSTEM AND METHOD FOR PROLONGING THE LIFETIME OF INTERNAL BATTERY

BACKGROUND OF THE INVENTION

The present invention relates to a memory management method for use in a portable computer or terminal. More particularly, the present invention relates to a memory management method for prolonging the lifetime of an internal battery in the portable computer or terminal having a non-volatile memory.

As computer information processing capability increases, the number and size of programs increase. As a result, the memory contained in a computer becomes larger and larger. Typically, a computer or portable terminal includes two types of memory—volatile memory and non-volatile memory. Non-volatile memory is a storage device for maintaining stored information even when power is not applied thereto. An EEPROM or flash memory is an example of a non-volatile memory. Volatile memory, on the other hand, does not retain the stored information when power is removed.

FIG. 1 illustrates a flowchart diagram of a data recording method of a general recording system using a non-volatile memory as a storage device. In step 110, a determination is made as to whether a data recording command for recording data is received. If the data recording command is received, data previously stored in a corresponding region in memory is deleted (step 120). Then, new data is recorded in the corresponding region in the memory (step 130). That is, when new data is recorded, the previous data recorded in the corresponding region in the memory is deleted according to a predetermined sequence, to allow for the recording of the new data. Thus, a controller such as a CPU continuously monitors the state of the memory for recording and deleting data. Such a continuous memory monitor of the controller causes unnecessary power consumption, and additional power consumption occurs due to the deleting and recording of data. Moreover, in a portable terminal which uses a limited capacity of power source (i.e., a battery such as a galvanic cell) power operation time is shortened due to power consumption resulting from frequent data deleting and recording operations.

Thus, a computer or portable terminal using a non-volatile memory requires a new memory management method capable of prolonging the lifetime of an internal cell.

SUMMARY OF THE INVENTION

To solve the above problems, it is an object of the present invention to provide a memory management method in a portable terminal, in which a recording operation is first performed in an unused memory region, an address value for data to be deleted is registered in a delete queue, and all data to be deleted is deleted at a time when external power is supplied, thereby prolonging operation time of the internal cell.

To accomplish the above and other objects of the present invention, there is provided a memory management method in a portable terminal, in which power is supplied from an internal cell or an external power source and a non-volatile memory is used as a storage device. The memory management method includes the steps of: (a) creating a delete queue to register address values in a memory region in which data to be deleted has been recorded; (b) judging whether a recording data in the memory is received; (c) judging whether an idle region exists in the memory when the recording command is applied; (d) recording data in the corresponding idle region when the idle region exists; (e) judging whether a delete command for deleting the data recorded in the memory is received; (f) registering in the delete queue corresponding address values of the memory region in which the data to be deleted has been recorded, when the delete command is input; (g) judging whether power is supplied from the external power source; and (h) deleting the address values registered in the delete queue and the data of the corresponding regions indicated by the address values when the power is supplied from the external power source.

BRIEF DESCRIPTION OF THE DRAWINGS

The preferred embodiments are described with reference to the drawings, wherein.

DETAILED DESCRIPTION OF THE PREFERRED EMBODIMENTS

Preferred embodiments of the present invention will be described with reference to the accompanying drawings.

Figure 1:
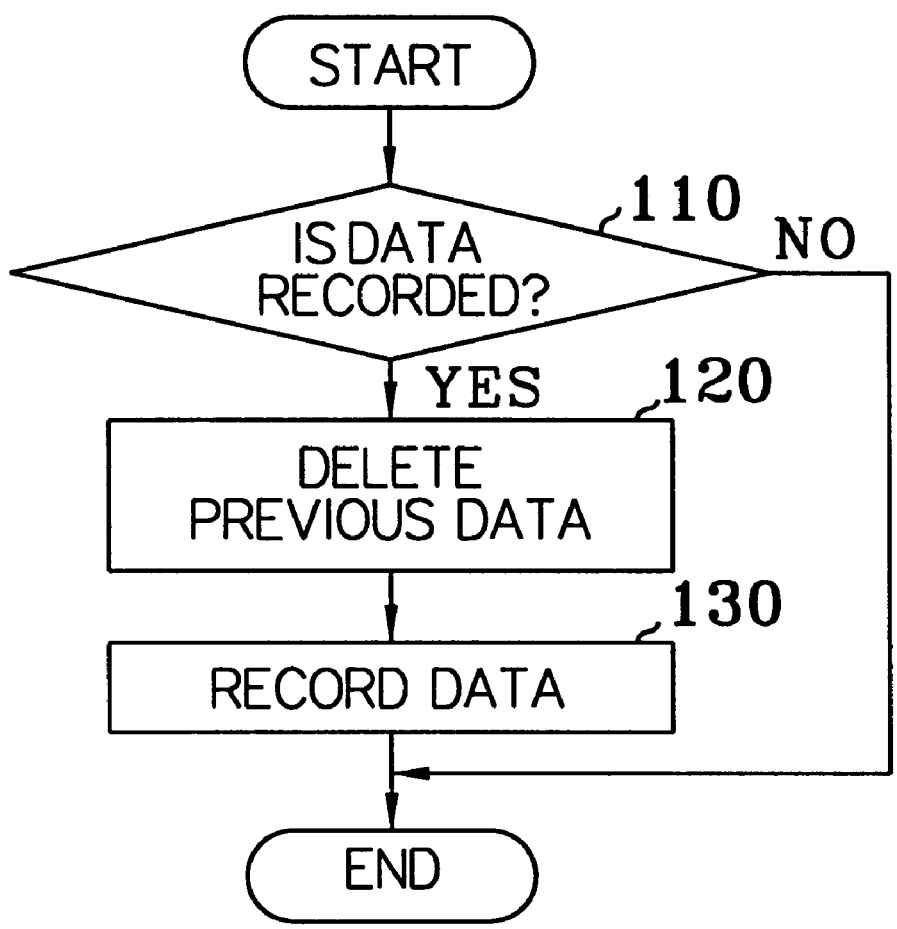
FIG. 1 shows a flowchart diagram of a data recording method for a general recording system using a non-volatile memory as a storage device.
Figure 2:
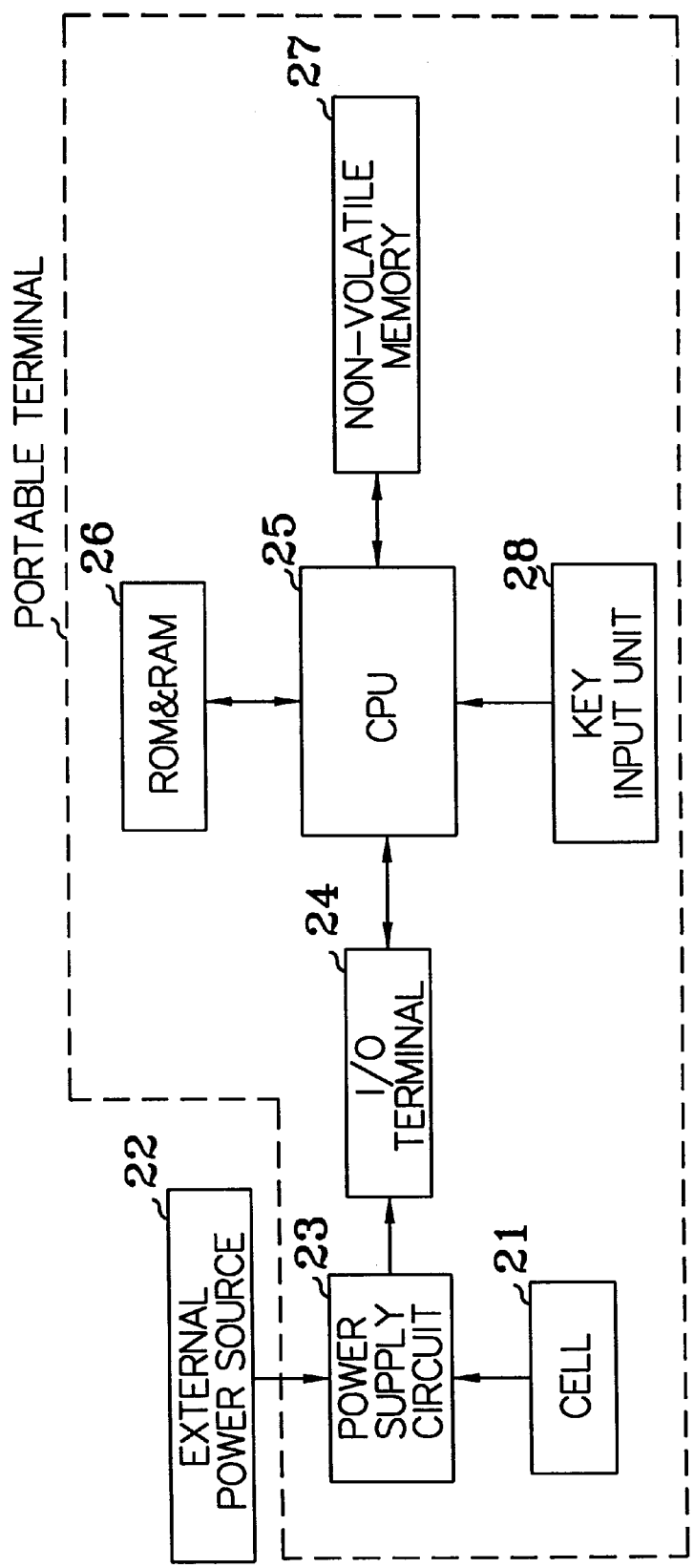
FIG. 2 illustrates a block diagram of a portable terminal according to the present invention.

FIG. 2 shows a portable terminal including a cell 21 as a main power supply. The cell 21 supplies power to a power supply circuit 23, which also receives power from an external power source 22. The external power source 22 is located outside of the portable terminal, and is connected to the power supply circuit 23 to supply power to the portable terminal or to supply power for charging the cell 21. The power supply circuit 23 supplies the power applied from the cell 21 or the external power source 22 to a central processing unit (CPU) 25. An input/output (I/O) terminal 24 is connected between the power supply circuit 23 and the CPU 25 to discriminate the power applied from both power sources 21 and 22. The I/O terminal 24 detects a point of time at which power is supplied from the external power source 22 to the power supply circuit 23. The portable terminal also includes a ROM and RAM 26 and a non-volatile memory 27. The CPU 25 controls recording and deleting of data as will be described in more detail below. A key input unit 28 receives a key signal from a user and is connected to the CPU 25.

Figure 3:
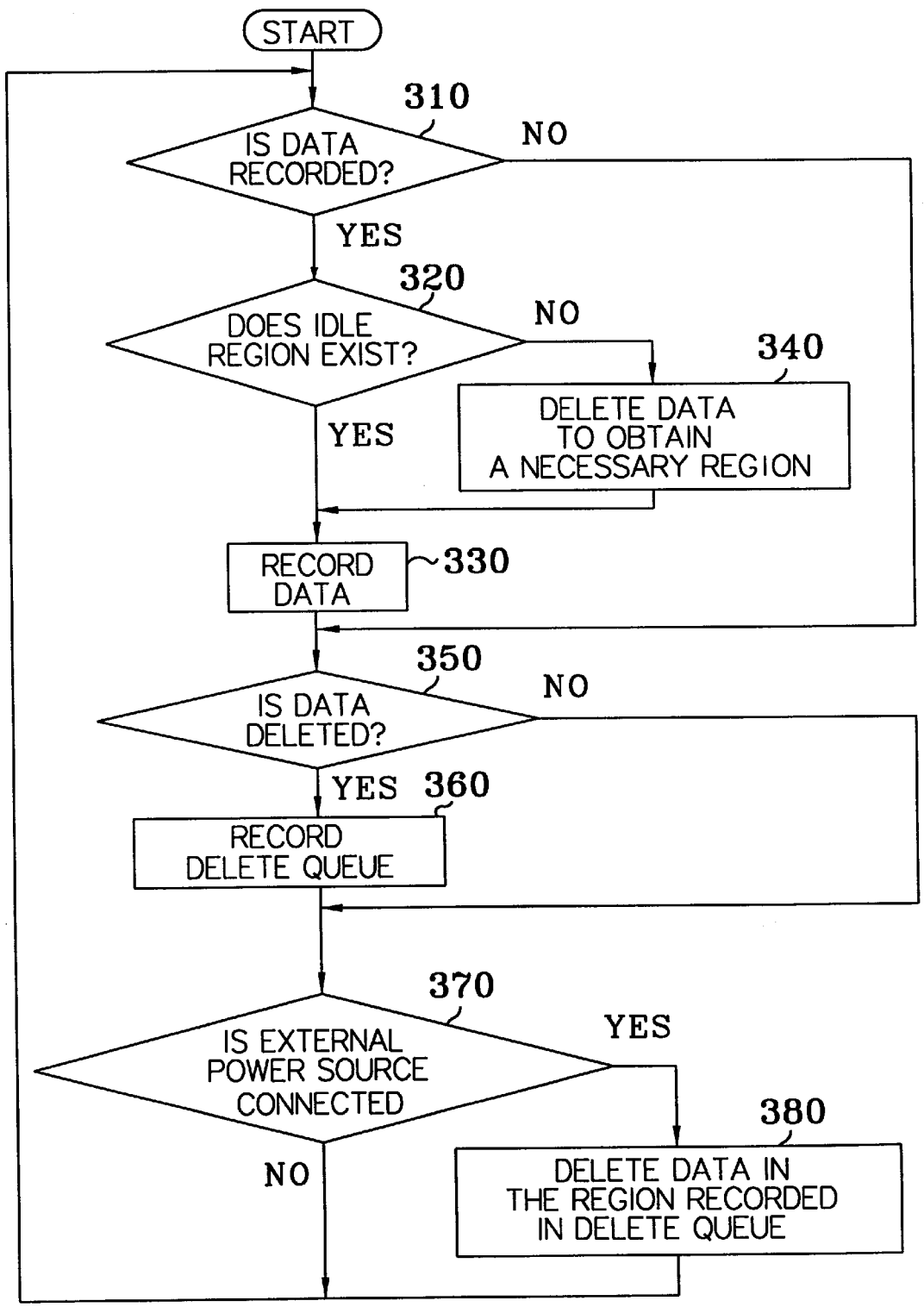
FIG. 3 illustrates a flowchart diagram of a memory management method for a portable terminal according to a preferred embodiment of the present invention.

FIG. 3 shows a flowchart diagram of a memory management method for a portable terminal according to a preferred embodiment of the present invention. The memory management method will be described in more detail with reference to FIGS. 2 and 3.

The CPU 25 detects a key signal input from the key input unit 28 and determines whether a data recording command is input or a data recording command is generated for the data produced during execution of a program (step 310). If a data recording command is not received, the program proceeds to step 350. However, if a data recording command is received, it is determined whether an idle region (a region where no data is recorded) exists in the non-volatile memory 27 (step 320). If an idle region exists, data is recorded in the idle region (step 330). If an idle region does not exist (with a size at least as large as the data to be recorded), a minimum recording region is made for recording the data. That is, previously recorded data is deleted, so that a region necessary for recording the new data is available (step 340). Then the program proceeds to step 330.

Subsequently, it is determined whether a data deletion command is received as an input (step 350). If a data deletion command is not received, the program proceeds to step 370. However, if a data deletion command is input, address values of the data to be deleted are recorded in a delete queue (step 360). Then, the CPU 25 determines whether the external power source 22 is connected to the portable terminal (step 370). This determination is made based on the I/O terminal 24 which detects whether the external power source 22 is connected. That is, from an interrupt mode or polling mode, the CPU 25 checks the status of the I/O terminal 24 to determine whether the portable terminal is connected or disconnected to the external power source 22. When the external power source 22 is connected to the portable terminal and external power is supplied thereto, the CPU 25 deletes all of the address values recorded in the delete queue and the data of the corresponding region indicated by the address values (step 380). This process is performed at one time. Meanwhile, if the external power source 22 is not connected thereto, the program returns to step 310. Thus, in this case, the address values and corresponding data is not deleted.

FIGS. 4A through 4F illustrate data recording and deleting operations in the memory according to the memory management method. FIGS. 4A through 4F show a memory map of data recording regions and addresses A1, A2, A3 and A4 each a uniformly divided recording region in the non-volatile memory 27, and a delete queue for registering the address values of data to be deleted among the data recorded in the memory map. The delete queue has a first-in-first-out pattern for sequentially registering data to be deleted. The delete queue is set in a portion in the non-volatile memory 27, or set in a certain region of an external memory such as a ROM and RAM 26.

Figure 4A:
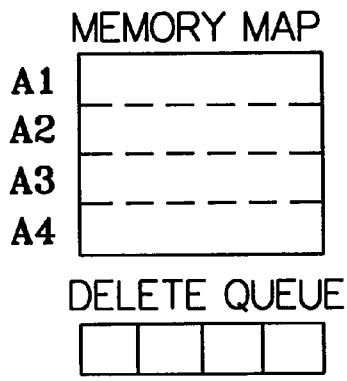
FIGS. 4A through 4F illustrate data deletion and delete queues in the memory for use in the present invention.
Figure 4B:
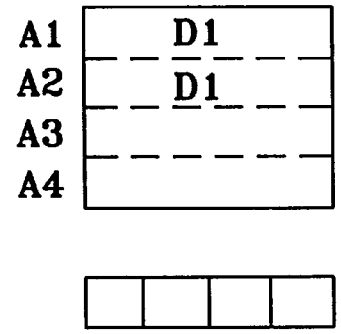
Figure 4C:
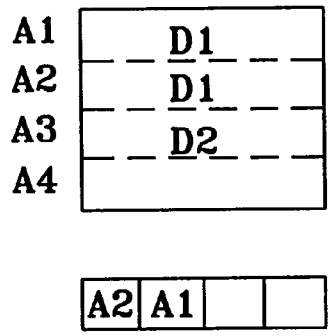

FIG. 4A shows a state where no data is recorded in the non-volatile memory 27. FIG. 4B shows a state where data D1 is recorded in regions having the address values A1 and A2 of the non-volatile memory 27. That is, when data is recorded, data is recorded in the empty regions having address values A1, A2, A3 and A4 of the non-volatile memory 27 as shown in FIG. 4A. FIG. 4C shows a change of the memory map and delete queue when data D2 is applied to update the data D1 recorded in the non-volatile memory 27. Here, the regions which can be used for recording are the idle regions having address values of A3 and A4. The data D2 for updating the data D1 is recorded in one of the empty regions. Also, the address values A1 and A2 of the memory map in which the previous data D1 has been recorded are registered in the delete queue one after the other.

Figure 4D:
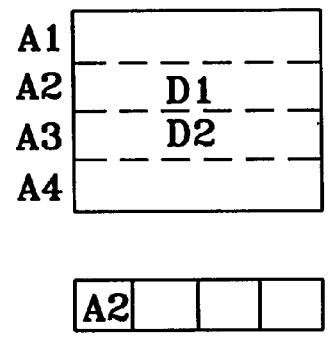
Figure 4E:
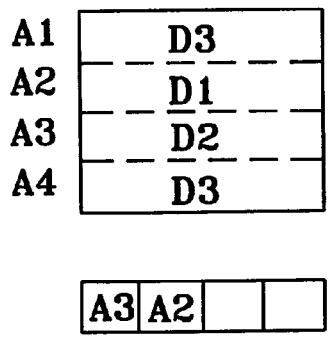
Figure 4F:
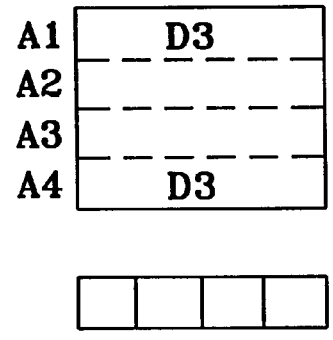

Meanwhile, the available idle regions are insufficient for recording data D3, for example, where the data D3 consumes two regions and only one idle region remains as shown in FIG. 4C. Here, if data D3 to be recorded requires two idle regions, the oldest address values among the address values registered in the delete queue and the previous data recorded in the corresponding regions indicated by the oldest address values are deleted. Therefore, the oldest address value A1 is deleted, and the previous data which is D1 recorded in the regions indicated by the address values A1 is deleted. FIG. 4D shows a memory map from which the data has been deleted in the region A1 and a delete queue from which the address value A1 has been deleted. When a necessary idle region is secured in the above operation, data D3 is recorded in the regions indicated by the address values A1 and A4. FIG. 4E shows that an address value A3 in the memory region in which the previous data D2 has been recorded is recorded in the delete queue when new data D3 updates previously recorded data D2. FIG. 4F shows that address values A3 and A2 registered in the delete queue and data D1 and D2 in the regions indicated by the address values are deleted all at the same time when external power is input.

As described above, the present invention minimizes a deletion process for previously recorded data when new data is recorded, thereby reducing power consumption of a cell in the portable terminal using a limited capacity cell and prolonging the lifetime of the cell. Also, the present invention can recover data when a user desires recovery of the data, unless the data corresponding to address values recorded in the delete queue have already been deleted.

There has thus been shown and described a novel memory management method for use in a computer or portable terminal which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A memory management method in a portable terminal comprising an internal power cell and being selectively connectable to an external power source for supplying power thereto and comprising a memory including a non-volatile memory storage device, said memory management method comprising the steps of:

(a) creating a delete queue in the memory of the portable terminal to register address values corresponding to data to be deleted followed by the steps of;

(b) determining whether a data recording command for recording data in the memory is received (c) determining whether an idle region exists in the memory if said data recording command is received;

(d) recording data in the idle region when said idle region exists;

(e) creating a number of required idle regions corresponding to the amount of data to be recorded when said idle region does not exist;

(f) determining whether a data deletion command for deleting data recorded in the memory is received;

(g) registering in the delete queue address values corresponding to the data to be deleted when the data deletion command is received;

(h) determining whether power is supplied from the external power source; and
deleting the address values registered in the delete queue and the data corresponding to those address values when the power is supplied from the external power source.

2. The memory management method according to claim 1, wherein said delete queue is created in a first-in-first-out form so that the address values corresponding to the memory regions to be deleted are deleted in sequence.

3. The memory management method according to claim 1, further comprising the step of deleting, in sequence, corresponding address values and data in the corresponding regions indicated by the address values from the oldest address value registered in the delete queue as needed when the available idle region is less than a region necessary for recording data.

4. The memory management method according to claim 1, further comprising the step of determining whether said external power is supplied via the output signal of an input/output (I/O) terminal connected between a power supply circuit and a central processing unit (CPU).

5. The memory management method according to claim 4, wherein said CPU determines that external power is supplied when the output signal of said I/O terminal is an interrupt signal.

6. The memory management method according to claim 4, wherein said CPU determines that external power is supplied when the output signal of said I/O terminal is a polling signal.

7. A memory management method for use in a computer being powered by one of an internal power cell and an external power source, comprising the steps of:

storing a first set of data in a first portion of a memory of the computer;

receiving commands for recording a second set of data in an overlapping portion of the memory of the computer including at least some of said first portion of memory;

determining if a second portion of memory, different from said first portion of memory, is available for storing said second set of data, when the computer is being powered by the internal battery cell;

recording said second set of data in said second portion of memory, if available, and if the computer is being powered by the internal battery cell;

storing in a delete queue information sufficient to identify said first set of data for subsequent deletion; and deleting said first set of data when said computer is powered by said external power source and if such deletion is necessary for storage of said second set of data.

8. The memory management method according to claim 7, wherein said first set of data includes user data and address information.

9. The memory management method according to claim 7, wherein if the size of said second portion of memory is less than said second set of data, then deleting said first set of data from said first portion of memory and storing said second set of data in said first portion of memory.

10. The memory management method according to claim 7, wherein said delete queue is a first-in-first-out memory that the information stored in said delete queue is deleted in sequence.

11. The memory management method according to claim 7, wherein said information comprises address values and said method further comprises the step of deleting, in sequence, address values and corresponding data in from the oldest address value registered in the delete queue as needed when available portions in said memory is less than the size required to store additional sets of data.

12. The memory management method according to claim 7, further comprising the step of recovering said first set of data inadvertently deleted by restoring said first set of data from said delete queue.

13. The memory management method according to claim 7, wherein said memory is a non-volatile memory storage device.

14. A portable computer comprising:

a power supply circuit, coupled to at least one of an internal cell and an external power supply, said power supply circuit providing sufficient power to said portable computer for operation;

an I/O terminal coupled to said power supply circuit, said I/O terminal detecting whether said power supply circuit is supplying power from said internal cell or external power supply;

a non-volatile memory; and a central processing unit (CPU) coupled to said memory and being operative to record and delete data from said memory, and coupled to said I/O terminal for determining whether said computer is being powered by said internal cell or external power supply, wherein said CPU records and deletes data from said memory in accordance with a memory management algorithm, such that when said portable computer is being powered by said internal cell, new data to be recorded in said memory is recorded in an idle region of said memory, having no data, and when said computer is powered by said external power supply, recorded data may be deleted in order to enable recording of new data recorded therein, to avoid deleting data.

15. The computer according to claim 14, wherein in accordance with said memory management algorithm, said CPU records a first set of data in a first portion of said memory, receives a command to record a second set of data in said first portion of said memory, stores said second set of data in a second portion of memory, and stores in a delete queue information sufficient to identify said first set of data for subsequent deletion.

16. The computer according to claim 15, wherein in accordance with said memory management algorithm, said CPU only records said second set of data in said second portion of memory if the size of said second portion of memory is equal to or greater than the size of said second set of data.

17. The computer according to claim 15, wherein in accordance with said memory management algorithm, said CPU deletes said first set of data only when said computer is being powered by said external power supply.

18. The computer according to claim 15, wherein in accordance with said memory management algorithm, if said first set of data is inadvertently deleted, said CPU recovers said first set of data from said delete queue.

19. The computer according to claim 15, wherein said delete queue arranged as a first-in, first-out buffer, and said CPU deletes information stored in said delete queue in first-in, first-out sequence.

20. The computer according to claim 15, wherein in accordance with said memory management algorithm, said CPU records said second set of data in said first portion of memory if the size of said second portion of memory is less than the size of said second set of data.

* * * * *